July 11, 1939.  K. SCHMER  2,165,983
POWER-PLANT CONTROL APPARATUS
Filed Oct. 20, 1938   2 Sheets-Sheet 1
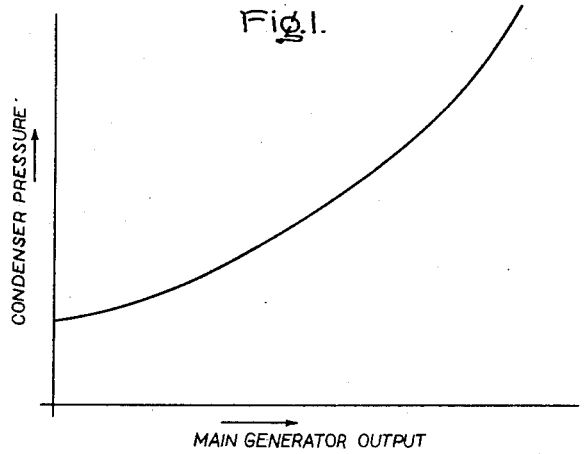
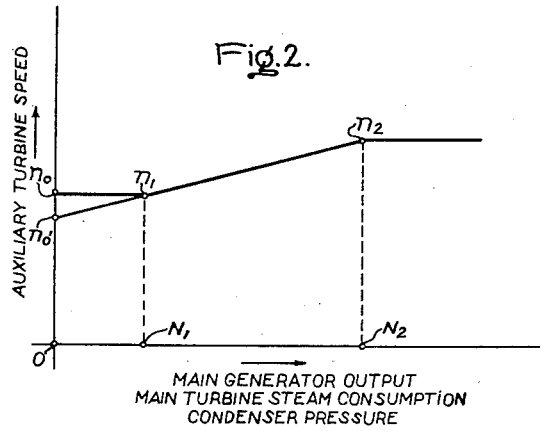
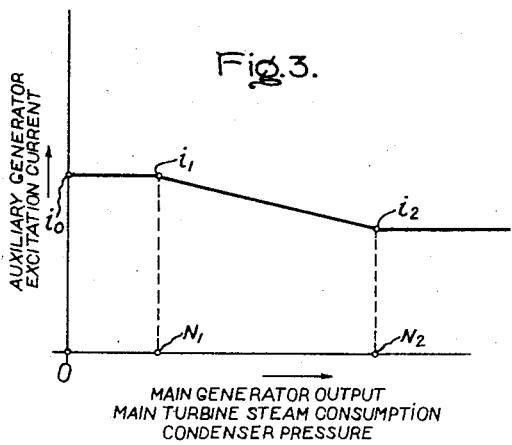
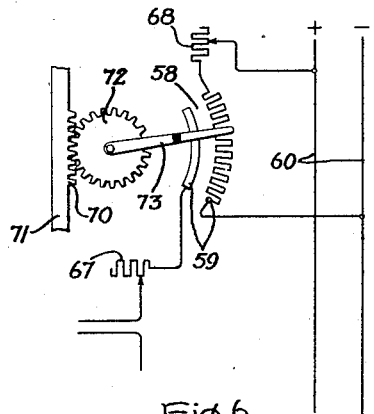
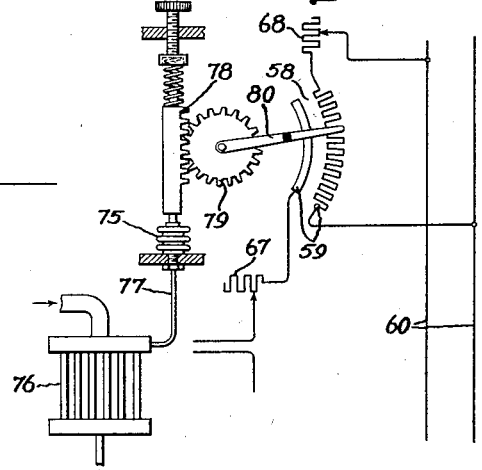
Inventor:
Karl Schmer,
by Harry E. Dunham
His Attorney.

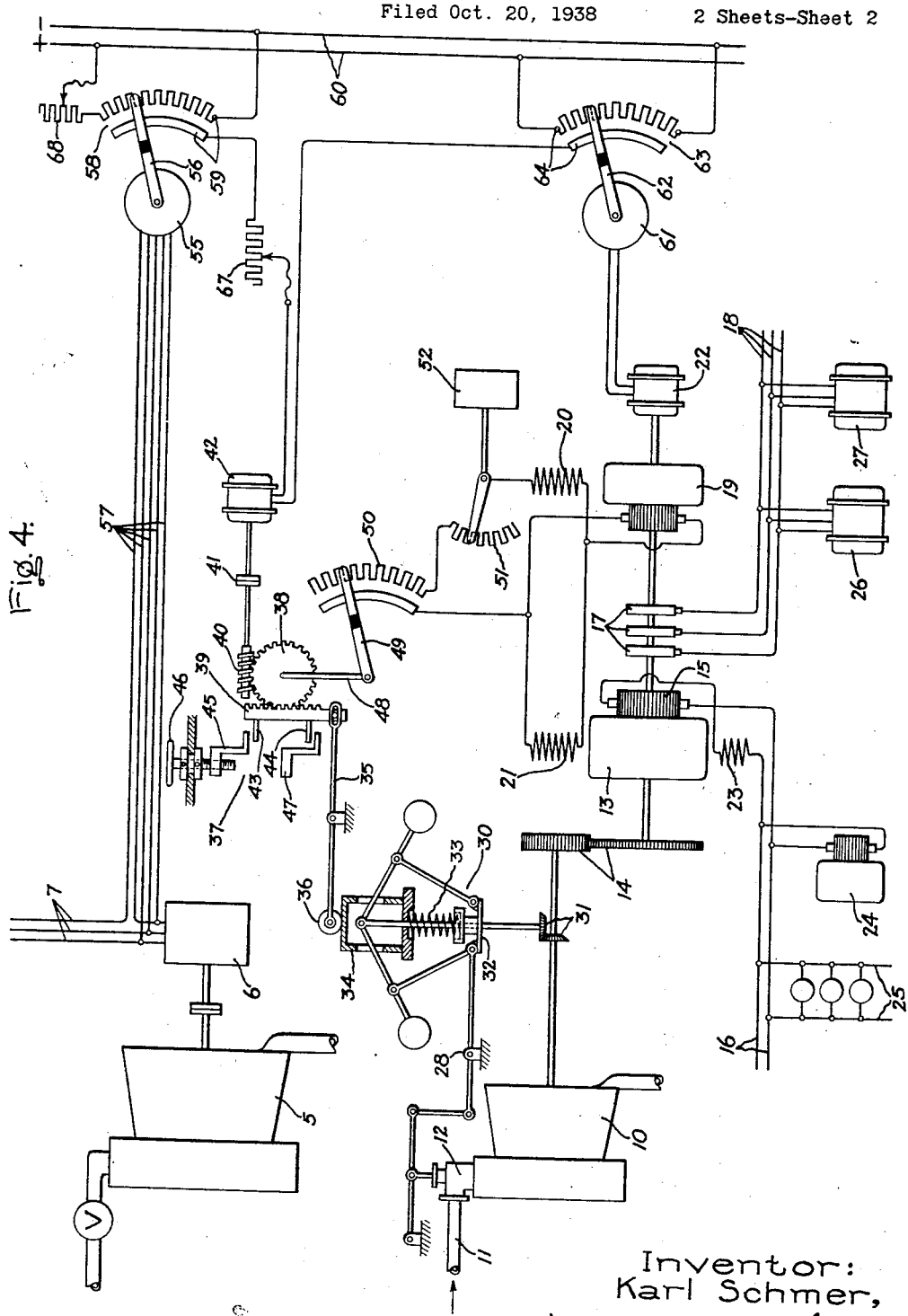

Patented July 11, 1939

2,165,983

UNITED STATES PATENT OFFICE 2,165,983

POWER-PLANT CONTROL APPARATUS

Karl Schmer, Berlin-Mariendorf, Germany, assignor to General Electric Company, a corporation of New York Application October 20, 1938, Serial No. 236,091
In Germany November 1, 1937

12 Claims. (Cl. 290—4)

This invention relates to power plant control apparatus and more particularly to arrangements for regulating the auxiliaries of a steam turbine driven vehicle, which auxiliaries are electrically driven by means of an auxiliary turbine set; the power being transmitted from the main turbine to the locomotive wheels by means of alternating current or by means of a hydraulic drive.

If alternating current is used to transmit the power from the main turbine to the driving wheels of a steam turbine driven vehicle, it is necessary, in view of the speed regulation of the main turbine, or of the vehicle, to drive the auxiliary machines separately from the main turbine. This is also the case when the power transmission from the main turbine to the locomotive wheels is accomplished by means of a hydraulic drive. As usual, the speed regulation in the case of alternating current power transmission is accomplished by adjusting the main turbine speed within a large regulating range of approximately 1 to 10. Similar conditions apply also to hydraulic power transmission. However, the auxiliaries of the steam plant require partly a constant speed and partly a change in the speed, that speed differing then materially from that of the main turbine.

The advantage of driving the auxiliaries electrically is well known. It has also been found practical to drive a part of the auxiliaries by means of alternating current, for instance three-phase current, and another part with direct current.

All those auxiliaries are supplied with direct current which receive their energy from an auxiliary battery for the first starting of the installation. Such devices, in the case of a forced circulation boiler, are the flue-gas blower, the vacuum pumps, and the circulating pump. It is also advantageous to supply those auxiliaries with direct current the speed of which must be to a great extent independent of the speed regulation of the other auxiliaries. In this respect the flue-gas blower is to be mainly considered. It cannot be driven from the main turbine inasmuch as its speed regulation must be independent of that of the main turbine, the control of the firing having to depend entirely on the judgment of the engineer.

Those auxiliaries which have approximately a constant speed, or which require a speed regulation within narrow limits are suitably operated by alternating current. Among these auxiliaries are the comparatively large motors for driving the condenser blower and the motor for driving the air-brake compressor. The advantage of supplying these auxiliaries with alternating current lies mainly in the fact that the motors may be built as simple, squirrel cage rotor motors, so that the commutators and their brush systems can be dispensed with. As a result, the machines need no constant careful supervision and maintenance.

According to the invention, the speed of the auxiliary turbine set is regulated either as a function of the power output or of the steam consumption of the main turbine, or, as a function of the condenser pressure. This type of regulation is of particular advantage, especially as regards the blower motors for the condensation plant as there is a direct relationship between condenser pressure and power output of the main turbine. The condenser pressure of the installation, in the case of small loads, or no load, amounts to approximately 0.3 atmosphere absolute. In the case of nominal load, it amounts to 0.8 atmosphere absolute, and at overloads, to 1.2 to 1.4 atmospheres absolute. In order to attain such a "sliding" condensation, which depends on the load, the blower motor speed must be regulated within 100 per cent and 65 to 80 per cent. It must be borne in mind here that the blower output increases and decreases with the third power of the blower motor speed.

It is an object of this invention to provide a new and improved arrangement for regulating an auxiliary turbine so as to maintain a predetermined relationship between its speed and a function of the power output of the main turbine.

It is a further object of this invention to provide a new and improved regulating arrangement for an auxiliary turbine to which is coupled a generator or generators for supplying both alternating and direct current to power plant auxiliaries, the turbine speed being regulated in accordance with a function of the load on the main turbine and the direct current generator being simultaneously regulated through the turbine regulator for constant potential output.

For a consideration of what I believe to be novel and my invention, attention is directed to the following description and the claims appended thereto taken in connection with the accompanying drawings.

In the drawings, Figs. 1, 2, and 3 are curves illustrating functional characteristics of the power plant arrangement; Fig. 4 is a schematic diagram of a power plant system embodying my invention; while Figs. 5 and 6 illustrate modifications of the regulating apparatus.

Referring to Fig. 1, a characteristic curve is shown, illustrating the change in condenser pressure with respect to the changes in the output of the main generator which supplies the main motors of the vehicle. Fig. 2 illustrates the nature in which the speed of the auxiliary turbine set must be adjusted as a function of the main generator output, of the main turbine steam consumption, or of the condenser pressure, all of which are plotted on the abscissa, the auxiliary turbine set speed being plotted on the ordinate. It is practically immaterial whether the auxiliary generators constitute separate machines, that is to say, one for direct current, the other for alternating current, or whether a single double-current machine is provided. The speed regulation which depends upon the load is represented by the line $n_0'$—$n_1$—$n_2$. As accurate tests have shown, a rectilinear dependence may be applied with sufficient accuracy. It is of course possible to have this curve assume any desired shape. To this end, it is only necessary to proceed with the corresponding resistance curves at the regulating apparatus. With the load-dependent speed regulations with which we are dealing here, it is practical to establish upper and lower limits, so that below a certain load, $N_1$, of the machine, the speed of the auxiliary turbine set will remain constant, as is shown by the line $n_1$—$n_0$. It is also advisable to prevent a further speed increase of the auxiliary turbine set beyond an upper limit. This is indicated at the output $N_2$, to which the maximum speed $n_2$ of the auxiliary turbine set corresponds. Because the power absorption of the blower motors increases with the third power of the speed, it is undesirable to overload unduly the blower motors for short-time, high-load peaks, or to design the motors especially for this limit case.

The curve of Fig. 3 illustrates the adjustment of the excitation for the auxiliary generator, which adjustment is automatically made simultaneously with speed regulation, provided the auxiliary generator is a double-current generator. By the arrangement disclosed the voltage of the direct current auxiliaries is maintained approximately constant, independently of the speed of the auxiliary turbine set. As is illustrated in Fig. 3, a small output of the main generator corresponds to a large excitation of the auxiliary generator, and vice-versa, and under this condition there corresponds to the lower limit value $N_1$ of the generator output, the upper limit value $i_1$ of the exciter current, which remains constant up to $i_0$, the exciter current being represented by the ordinates. In the same manner, there corresponds to the upper limit value $N_2$ of the main generator output, the lower limit value $i_2$ of the excitation.

Fig. 4 illustrates how the arrangement may be designed for automatic regulation of speed and excitation, independently of the main generator output. The main turbine 5 is coupled to a main generator 6 which supplies power to the propulsion motors (not shown) through the conductors 7. The operating fluid is supplied to the auxiliary turbine 10 by means of conduit 11, and through the adjustable inlet valve 12. The auxiliary turbine 10 drives the auxiliary generator 13 by means of the gearing 14. In this instance the auxiliary generator is shown as a double-current generator, which supplies through commutator 15 the direct current auxiliary system 16 and through the slip rings 17 the three-phase auxiliary system 18, it being assumed that a three-phase alternating current is used. It is obvious that any other number of phases may be provided for the alternating current auxiliary system, provided a symmetrical revolving field is obtained. The auxiliary exciter machine 19 is mounted on the same shaft with the auxiliary generator. This auxiliary exciter machine has a shunt circuit for energizing its exciting winding 20. It energizes also the field winding 21 of the auxiliary generator 13. At one end of this turbine generator set, a small revolution-counting machine 22 is mounted, which supplies, at its terminals a direct current measuring voltage which is proportional to the instant speed. The auxiliary generator 13 has an additional compound winding 23, by means of which the voltage at the commutator is maintained constant independently of the instant load. The direct current system 16 supplies, for instance, the flue-gas blower motor 24, the lighting circuit 25, and similar loads, the other auxiliaries having been omitted for the sake of simplicity. The three-phase auxiliary system 18 feeds the two condenser blower motors 26 and 27 and other similar auxiliaries (not shown).

As has been already mentioned, a separate direct current and a separate three-phase auxiliary generator can be used instead of the double-current generator, in which case the simultaneous adjustment of the excitation is generally made only at the direct current auxiliary generator.

The speed regulation of the auxiliary turbine set is accomplished by means of the speed regulator 30, which is driven, through gearing 31, from turbine 10, and which adjusts the regulating valve 12 through the governor sleeve 32. In order to regulate the speed of the auxiliary turbine set as a function of the output or steam consumption of the main turbine, or of the condenser pressure, it is possible to shift the linkage point 28 of the governor elements under the influence of a corresponding regulating impulse. With the linkage point remaining stationary, the tension of the governor spring 33 may be adjusted under the influence of such an impulse. In the physical embodiment disclosed, it is the latter possibility which is taken into consideration. The upper abutment of the governor spring is given the shape of an adjustable cap 34. The adjusting element 35 is adapted to engage this cap 34 and apply a tension to the governor spring 33 through roller 36, which differs in accordance with the load of the main generator or the steam consumption of the main turbine or the condenser pressure. The spring tension is adjusted by means of the device 37, which consists in the main of an adjusting wheel 38 and a cooperating rack 39. The adjusting wheel 38 is driven by means of a worm 40, which is rotated through a friction coupling 41 by the adjusting motor 42. To limit the upper and the lower speed of the auxiliary turbine set, two lugs 43 and 44 have been provided on rack 39, which are rigidly connected to the latter. The lug 43 serves for establishing the upper speed limit of the auxiliary turbine set. This limit is established by the blocking member 45, which can be adjusted, for instance, by means of a hand wheel 46, through a screw spindle, depending upon the desired operating conditions. The lower speed limit is determined by means of the blocking member 47, which, similar to 45, can be adjusted at will in accordance with the desired operating conditions.

The change in the excitation of the auxiliary generator or generators which is to be accomplished simultaneously with the change in speed (see Fig. 3), is also accomplished by means of the speed adjusting device, according to the represented physical embodiment. This is indicated schematically by the shaft 48 of the adjustment wheel 38, which shaft displaces a sliding contact making arm 49 on an adjustable resistance 50 in accordance with the desired change in excitation. This adjustment is dependent upon the load, for example, of the main generator, or on the steam consumption of the main turbine, or on the condenser pressure. The regulating resistance 50 is in the shunt excitation circuit of the auxiliary generator exciter 19. In this circuit, is an additional regulating resistance 51, which may be adjusted at will, manually or automatically. This additional resistance may be set by means of a suitable regulating device 52, according to any desired conditions. Instead of this regulation of the excitation, one could also use an additional exciter winding on the auxiliary generator, which winding would be then energized through resistance 50, from the battery. As can be seen, any one of the three physical embodiments for changing the excitation may be used.

In Fig. 4 is illustrated an arrangement which brings about in a simple and systematic manner, the desired regulation of the speed of the auxiliary turbine set, and of the excitation of the auxiliary generator either as a function of the main generator load or of the steam consumption of the main turbine, or as a function of the condenser pressure. In this arrangement, use is made of a well known procedure, according to which all measuring and regulating quantities are transformed into direct current auxiliary quantities, in such a way that their regulating output, which is directly proportional to the regulating conditions, is delivered to the adjusting motor 42. In this arrangement, a measuring element 55 is provided, whose pointer 56 is deflected proportionally to the output of the main generator, or proportionally to the steam consumption of the main turbine, or proportionally to the condenser pressure. This measuring element may be a watt meter, which receives the various measuring quantities through conductors 57 connected across the main generator leads. The pointer 56 of this measuring element slides on a potential divider 58 and imparts to the terminals 59 a measuring quantity or an indication which is proportional to one of the abovementioned operating quantities. The potential divider is supplied from a small direct current auxiliary system 60. The measuring quantity, which can be obtained at the terminals 59, may be considered as an actual indication of the instant main turbine load. For the auxiliary set, a similar indication is obtained which is proportional to the speed of the auxiliary turbine set. This can be attained, for instance, by means of a voltage measuring instrument 61, whose pointer 62 is deflected proportionally to the voltage indicated by the measuring dynamo 22. The pointer 62 acts likewise on a potential divider 63 wherefrom a direct current measuring quantity may be derived at the terminals 64 which is proportional to the auxiliary turbine set speed. The measuring quantities furnished by the two potential divider arrangements are connected in opposition to each other, the differential indication, or the currents of equalization, flowing between the potential dividers being transmitted to the adjusting motor 42. This adjusting motor operates to regulate the speed of the auxiliary turbine set until the circulating current becomes zero, at which time the indications are properly matched. For adjusting the speed characteristic of the auxiliary turbine set, regardless of its dependence on one of the above mentioned three operating quantities, suitable regulating resistors 67 and 68 have been provided. As has been already mentioned, the speed characteristic can be given any desired shape by a suitable dimensioning of the resistors at the potential dividers, according to Fig. 2. Moreover, the limitation of the auxiliary turbine generator speed, upward and downward, may be accomplished also directly by suitable steps or by suitable dimensioning of a potential divider arrangement according to Fig. 4.

Instead of a regulation which depends upon the power output, one can use a regulation which operates either as a function of the steam consumption of the main turbine, or as a function of the condenser pressure. Such a dependence may be desired from an operating standpoint, when it is a question of operating with the optimum steam consumption figures, or when the power transmission from the main turbine of the power vehicle to the drivers does not involve alternating current, but takes place by means of a hydraulic transmission. In Figs. 2 and 3, instead of the generator output, either the steam consumption or the pressure in the condenser must be applied on the abscissa. As regards the regulating device itself, it can remain unchanged, as shown in Fig. 4 except that such a measuring instrument must be substituted for the wattmetric measuring instrument 55, as will furnish a measuring quantity which is proportional to the steam consumption or the condenser pressure as the case might be. The steam consumption, for instance, may be represented by a measuring quantity which is proportional to the stroke of the regulating valve of the main turbine. Such a measuring quantity may be obtained by a resistance type arrangement connected to the valve rods, which arrangement will supply a direct current measuring quantity proportional to the valve stroke. As indicated in Fig. 5, a rack 70 may be arranged on the valve rod 71 of the main turbine. A toothed wheel 72 mounted in engagement with the rack is arranged to actuate the arm 73 across the potential divider 58 in proportion to the valve stroke.

A corresponding regulating measuring value, which is proportional to the condenser pressure may be obtained by substituting for the wattmetric device 55, a pressure responsive device of any well known type. For instance, as shown in Fig. 6, a pressure responsive element 75 connected to the condenser 76 by the capillary 77 is arranged for reciprocating the rack 78. The toothed wheel 79 mounted in engagement with the rack is arranged for actuating the arm 80 across the potential divider 58 in proportion to the condenser pressure.

Having described the principle of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In combination, a main turbine, an auxiliary turbine, a direct current generator driven by said auxiliary turbine, an exciter for said generator driven by said auxiliary turbine, an admission valve for said auxiliary turbine, governing means for said admission valve, means for adjusting said governing means including a direct current motor, a source of direct current, a first potential divider connected to said source, means responsive to the load on said main turbine for adjusting said potential divider, a second potential divider connected to said source, means responsive to the speed of said auxiliary turbine for adjusting said second potential divider, said motor connected to said two potential dividers whereby it is energized in accordance with the differential adjustment of said two potential dividers to maintain a substantially constant predetermined relationship between the speed of said auxiliary turbine and the load on said main turbine, and means driven by said motor for controlling the excitation of said exciter for maintaining substantially constant the output potential of said direct current generator.

2. In combination, a main turbine, an auxiliary turbine, means including a governor driven by said auxiliary turbine for regulating said auxiliary turbine, a direct current generator driven by said auxiliary turbine for supplying power for operating certain power plant auxiliaries at a speed independently of the auxiliary turbine speed, a multi-phase alternating current generator driven by said auxiliary turbine for supplying power for operating certain other power plant auxiliaries at a speed proportional to the speed of said auxiliary turbine and means for maintaining a predetermined relationship between the main turbine load and the auxiliary turbine speed by the adjustment of said auxiliary turbine regulating means.

3. In combination, a main turbine, a generator driven by said turbine, an auxiliary turbine, an adjustable governor driven by said auxiliary turbine for regulating the speed thereof, means for deriving an indication proportional to the power output of said generator, means for deriving an indication proportional to the speed of said auxiliary turbine, and means responsive to a differential of said indications for adjusting said governor so as to maintain a substantially constant predetermined relationship between the power output of said generator and said auxiliary turbine speed.

4. In combination, a main turbine, a valve for controlling the admission of operating fluid to said turbine, an auxiliary turbine, an adjustable governor driven by said auxiliary turbine for regulating the speed thereof, means for deriving an indication proportional to the setting of said main turbine admission valve, means for deriving an indication proportional to the speed of said auxiliary turbine, means responsive to a differential of said indications for adjusting said governor so as to maintain a substantially constant predetermined relationship between the settings of said main turbine admission valve and said auxiliary turbine speed.

5. In combination, a main turbine, an auxiliary turbine, means including a governor driven by said auxiliary turbine for regulating said auxiliary turbine, means for deriving an indication proportional to the operating fluid consumption of said main turbine, means for deriving an indication proportional to the speed of said auxiliary turbine, means responsive to a differential of said indications for adjusting the regulation of said auxiliary turbine so as to maintain a predetermined relationship between the operating fluid consumption of said main turbine and said auxiliary turbine speed.

6. In combination, a main turbine, a condenser therefor, an auxiliary turbine, means including a governor driven by said auxiliary turbine for regulating said auxiliary turbine, means for deriving an indication proportional to the condenser pressure, means for deriving an indication proportional to the speed of said auxiliary turbine, means responsive to a differential of said indications for adjusting the regulation of said auxiliary turbine so as to maintain a predetermined relationship between the condenser pressure and said auxiliary turbine speed.

7. In combination, a main turbine, an auxiliary turbine, a direct current generator and an alternating current generator driven by said auxiliary turbine, an exciter for said direct current generator driven by said auxiliary turbine, means for deriving an indication proportional to the load on said main turbine, means for deriving an indication proportional to the speed of said auxiliary turbine, a regulator responsive to a differential of said indications for varying the speed of said auxiliary turbine so as to maintain a predetermined relationship between the auxiliary turbine speed and the main turbine load, and means whereby said regulator simultaneously adjusts the excitation of said direct current generator for maintaining substantially constant the output potential thereof.

8. In combination, a main turbine, an auxiliary turbine, a double-current generator driven by said auxiliary turbine for supplying direct current and alternating current for operating the power plant auxiliaries, means for deriving an indication proportional to the power output of said main turbine, means for deriving a similar indication proportional to the speed of said auxiliary turbine, means responsive to a differential of said indications for adjusting the speed of the auxiliary turbine so as to maintain a predetermined substantially constant relationship between the main turbine load and the auxiliary turbine speed, and means for simultaneously adjusting the field excitation of said generator in accordance with said differential indication to maintain substantially constant the direct current output potential thereof.

9. In combination, a main turbine, an auxiliary turbine, a direct current generator driven by said auxiliary turbine, an exciter for said generator driven by said auxiliary turbine, means for adjusting the speed of said auxiliary turbine in proportion to a differential indication of the main turbine load and the auxiliary turbine speed, and means for controlling said exciter in inverse proportion to the speed adjustment of said auxiliary turbine so as to maintain substantially constant the output potential of said generator.

10. In combination, a main turbine, an auxiliary turbine, a generator driven by said auxiliary turbine, an admission valve for said auxiliary turbine, an adjustable governor driven by said auxiliary turbine for regulating said admission valve, means for deriving an indication proportional to the power output of said main turbine, means for deriving an indication proportional to the speed of said auxiliary turbine, and means responsive to a differential of said indications for adjusting said governor so as to vary the speed of said auxiliary turbine in accordance with the power output of said main turbine.

11. In combination, a main turbine, an auxiliary turbine, an adjustable governor driven by said auxiliary turbine for regulating said auxiliary turbine, and means responsive to a differential indication of the load on said main turbine and of the speed of said auxiliary turbine for varying the adjustment of said governor.

12. In combination, a main turbine, an auxiliary turbine, a governor driven by said auxiliary turbine for regulating said auxiliary turbine, a direct current motor for adjusting said governor, a source of direct current for said motor, and means for controlling said supply of current to said motor in response to a differential indication of the load on said main turbine and the speed of said auxiliary turbine.

KARL SCHMER.